April 29, 1941. R. H. ROSENBERG 2,239,977
BRAKE MECHANISM
Filed June 28, 1940
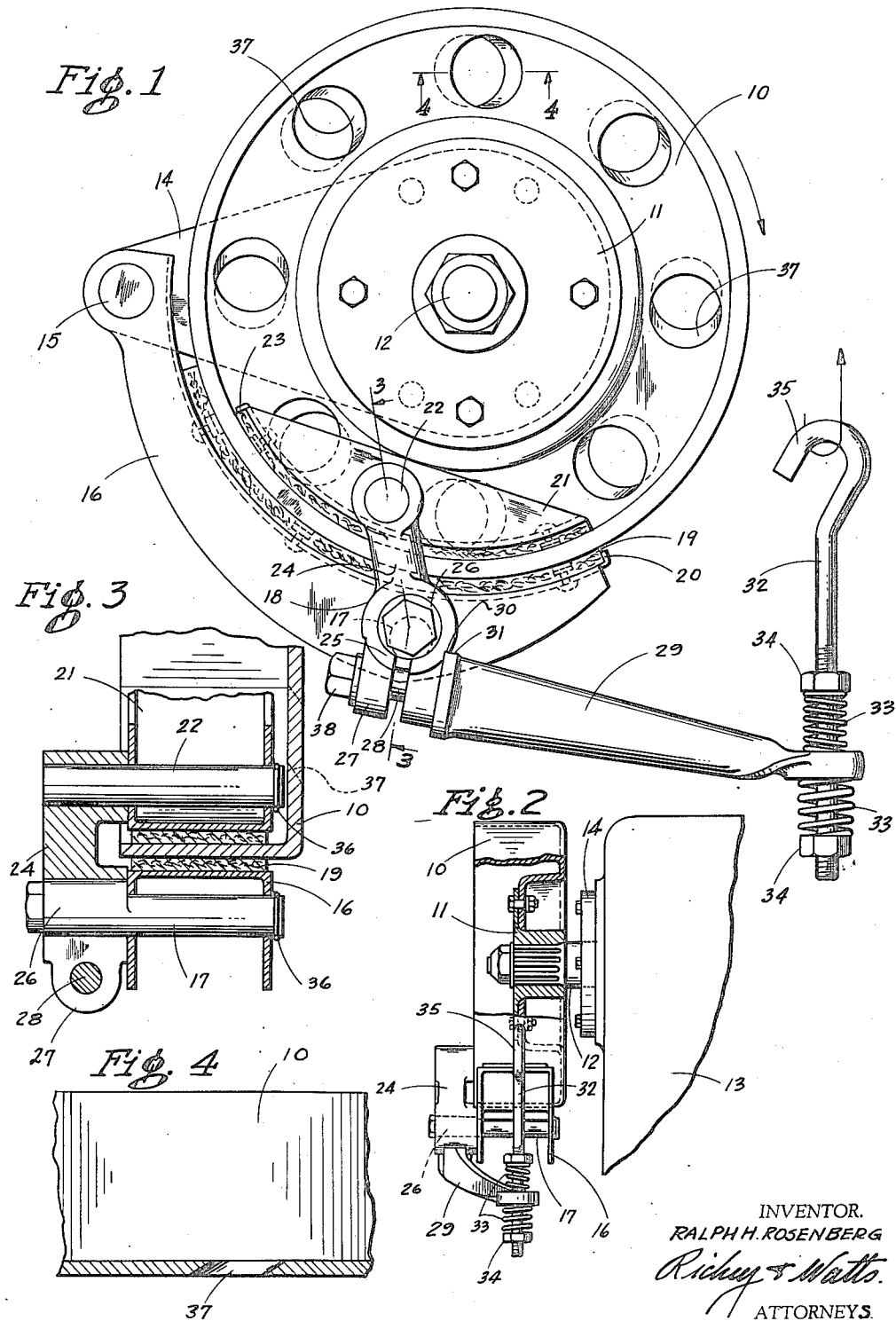
INVENTOR.
RALPH H. ROSENBERG
*Richey & Watts*
ATTORNEYS.

Patented Apr. 29, 1941

2,239,977

UNITED STATES PATENT OFFICE 2,239,977

BRAKE MECHANISM

Ralph H. Rosenberg, Detroit, Mich., assignor to Detroit Duo-Grip Brake Company, Detroit, Mich., a corporation of Michigan Application June 28, 1940, Serial No. 342,985

2 Claims. (Cl. 188—76)

This invention relates broadly to brakes for motor vehicles and more specifically to improvements in the brake shoe actuating mechanism and operating connections therefor.

One of the objects of the invention is to provide a brake structure embodying an internal and external shoe mounted for simultaneous application and full floating engagement with the brake drum.

Another object of the invention is to provide a composite lever and bell crank structure which is designed to support the brake shoes and transmit the resultant forces of the leverage directly to the brake drum.

Another object of the invention is to proportion the area of engagement of the external brake shoe in relation to the area of engagement of the internal brake shoe so that the brake will be self energizing when the direction of rotation of the brake drum is reversed.

Another object of the invention is to provide a brake structure which is capable of ready adjustment to compensate for the wear, is sturdy of structure and economic of manufacture.

Other objects and advantages more or less ancillary to the foregoing and the manner in which all of the various objects are realized will appear in the following description which, considered in connection with the accompanying drawing, sets forth the preferred embodiment of the invention.

Referring to the drawing wherein the embodiment of the invention is illustrated as applied upon a propeller shaft of a motor vehicle:

Fig. 1 is a front elevational view of a propeller shaft and brake drum of a motor vehicle and the brake connecting and actuating mechanism therefor;

Fig. 2 is a side elevational view of the brake mechanism shown in Fig. 1, a portion of the brake drum and driving flange being broken away and shown in section in order to illustrate the driving connection between the brake drum and propeller shaft;

Fig. 3 is a transverse sectional view of a fragmentary portion of the brake drum and brake actuating mechanism embodied in the present invention, the section being taken on a plane indicated by line 3—3 of Fig. 1; and Fig. 4 is a sectional view of a fragmentary portion of the brake drum showing the form of one of the openings provided in the web thereof for the passage of air therethrough, the section being taken on a plane indicated by the line 4—4 of Fig. 1.

Referring first to Fig. 2, the brake drum 10 is secured to a flange 11 mounted upon the splined end of a drive shaft 12 which extends from the transmission housing 13. Upon the rearward face of the transmission housing 13 there is a plate 14 having a boss in the outer end thereof which is drilled to receive a pin 15 for supporting the external brake shoe 16. The pin 15 is disposed in parallel relation to the outer flange of the brake drum 10, the out-bored portion thereof being substantially equal in length to the width of the flange. The external brake shoe 16 is preferably made of rolled sheet stock blanked and formed in configuration of an arcuate segment of channeled cross section having the flanges thereof pierced for the reception of the pin 15 and a pintle 17 mounted in the actuating arm or bell crank 18. The contour of the face of the brake shoe is concentric with the drum 10, the brake lining 19 being affixed thereon by rivets and through an inturned lip 20 struck from the center web of the channeled shoe.

The internal shoe 21 is likewise made of sheet stock drawn and sheared to form an arcuate segment for the support of the brake lining conterminous the inner circumference of the brake drum. The shoe is further formed with chordal flanges or side walls which are pierced for the reception of a second pintle 22 mounted in the bell crank 18. The brake lining is riveted upon the arcuate face of the shoe 21 and further supported by a lip 23 bent outwardly from the web of the channel.

The brake actuating arm or bell crank 18 comprises an arm 24, formed with a boss in the upper end thereof which is drilled and reamed for the adfixture of the pintle 22 therein. The lower end of the arm is constructed with a split boss 25 bored for the reception of an eccentric enlargement 26 formed on the end of the pintle 17. The lugs or ears 27 depending from the boss 25 are drilled to receive a threaded shank 28 turned in the end of a lever 29 which constitutes the second arm of the bell crank 18. A face of one of the ears 27 is formed with a ledge 30 provided for cooperative engagement with a shoulder 31 in the lever 29 to restrain the rotation thereof relative to the arm 17. The free end of the lever 29 is drilled for the reception of a brake actuating link 32 preferably connected with the lever through springs 33 telescopically mounted on the lineal end portion of the link rod 32 and retained thereon by nuts 34. The upper end of the link 32 is connected with the brake actuating linkage (not shown) in the conventional manner, an eye or the hook 35 as shown herein, forming an efficient and economic structure to facilitate the connection.

The free ends of the pintles 17 and 22 are grooved for the reception of split rings 36 which serve as effective and economic retention members for the brake shoes 16 and 21. The brake drum is preferably formed with apertures 37 in the web thereof drilled at acute angles in simulation of louvers to facilitate the circulation of air into the drum and over the brake shoe mounted thereon.

In the operation as the link 32 is elevated through the movement of the brake actuating linkage, the bell crank 18 will be rocked about its fulcrum within the arm or brake shoe 16, thus causing the downward movement of the end of the arm 24 and the consequent convergence of the internal and external brake shoes with the flange of the brake drum 10.

In practice the linkage coupled with the lever 29 is provided with suitable adjusting mechanisms to facilitate the support of the bell crank in its inoperative position, so that the brake shoes will be held in spaced relation with the drum. The shoes may, however, be further adjusted for running clearance with the drum by loosening the nut 38 on the threaded end portion of the lever 29 and rotating the pintle 17 until the eccentric enlargement 26 formed therein is positioned to effect the requisite allocation of the respective members of the assembly.

Since the area of engagement of the internal brake shoe is less than that of the external shoe severe self-energization of the brake will be avoided, however, when the brake is applied during the period in which the direction of rotation of the drum is reversed, as occurs when a vehicle rolls backwards down a hill, the mechanical advantage of the brake will be multiplied since the angle of the arm 24 is increased as the floating bell crank 18 oscillates about the pintle 22 and since the frictional drag of the longer external brake shoe 16 tends to increase such angle and thus foreshorten the vertical distance between the pintle and urge the shoes into more intimate contact with the drum.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A brake mechanism comprising, a brake drum, internal and external brake shoes coordinated therewith, a fixed post, a pin therein pivotally supporting said external brake shoe, one of said brake shoes being of greater length than the other, a bell crank, a pintle mounted therein, said internal brake shoe being pivoted thereon, a second pintle in said bell crank, said external brake shoe being pivoted thereon, the pintle in the longer brake shoe being disposed in greater spaced relation with said pin in said post than the pintle in the other brake shoe, whereby said bell crank will fulcrum on the pintle in the shorter brake shoe as the brake drum moves the pintle in the longer brake shoe away from said pin under the influence of the frictional resistance offered by the longer brake shoe.

2. A brake mechanism comprising, a brake drum, internal and external brake shoes coordinated therewith, a fixed post, a pin therein, the end portion of said external brake shoe being fulcrumed thereon, a bell crank, a pintle therein, the central portion of said internal brake shoe being fulcrumed thereon, a second pintle in said bell crank, the free end portion of said external brake shoe being fulcrumed thereon, brake lining on said brake shoes, the brake lining on said external brake shoe being longer than the brake lining on said internal brake shoe.

RALPH H. ROSENBERG.